United States Patent [19]

Tanaka et al.

[11] Patent Number: 5,500,676
[45] Date of Patent: Mar. 19, 1996

[54] METHOD OF ENCODING AND MULTIPLEXING PICTURE SIGNALS AND APPARATUS UTILIZING THE SAME

[75] Inventors: Takayuki Tanaka; Ryu Watanabe, both of Tokyo; Yuuichi Oonami, Iruma; Yoshizumi Eto, Sagamihara, all of Japan

[73] Assignees: Nippon Hoso Kyokai; Hitachi Denshi Kabushiki Kaisha, both of Tokyo, Japan

[21] Appl. No.: 278,239

[22] Filed: Jul. 21, 1994

[30]  Foreign Application Priority Data

Jul. 22, 1993 [JP] Japan .................................. 5-180965

[51] Int. Cl.$^6$ .............................................. H04N 7/12
[52] U.S. Cl. ................................... 348/387; 348/422
[58] Field of Search ............................. 348/385, 387, 348/414, 405, 417, 418, 422; H04N 7/12

[56]  References Cited

U.S. PATENT DOCUMENTS

| | | | |
|---|---|---|---|
| 4,713,776 | 12/1987 | Araseki | 348/398 |
| 5,115,309 | 5/1992 | Hang | 348/385 |
| 5,144,425 | 9/1992 | Joseph | 348/385 |
| 5,148,272 | 9/1992 | Acampora et al. | 348/397 |
| 5,337,085 | 8/1994 | Lee et al. | 348/414 |
| 5,361,097 | 11/1994 | Kolczynski | 348/437 X |
| 5,363,141 | 11/1994 | Faryar et al. | 348/437 X |

OTHER PUBLICATIONS

"Image Communication System" Technical Reports of the Institute of T.V. Engineers of Japan; vol. 16 #61; Oct. 1992; pp. 45–47.

Primary Examiner—Victor R. Kostak
Attorney, Agent, or Firm—Antonelli, Terry, Stout & Kraus

[57] ABSTRACT

A picture signal encoding multiplexing method and apparatus in which encoded data of a plurality of picture signals, which are respectively output from a plurality of picture signal encoding processing units, is multiplexed in a channel multiplexing unit. The method includes the steps of: generating a transmission rate control signal corresponding to information related to the encoded distortion supplied from each of picture signal encoding processing units in a channel multiplexing unit, and supplying the transmission rate control signal to each of the picture signal encoding processing units; and outputting the encoded data of the picture signal from each of the picture signal encoding processing units in accordance with the transmission rate control signal. The apparatus includes a unit provided in channel multiplexing unit for generating a transmission rate control signal corresponding to information relating to encoded distortion supplied from each picture signal encoding processing unit and for supplying the transmission rate control signal to each of the picture signal encoding processing units; and a unit for outputting, from each of the picture signal encoding processing units, the encoded data of the associated picture signal in accordance with the transmission rate control signal.

5 Claims, 6 Drawing Sheets

METHOD OF ENCODING AND MULTIPLEXING PICTURE SIGNALS AND APPARATUS UTILIZING THE SAME

BACKGROUND OF THE INVENTION

The present invention relates, in general, to a technology for encoding a picture signal, and more particularly to a method of encoding and multiplexing picture signals corresponding to a plurality of an encoding and multiplexing apparatus utilizing the same.

In recent years, considerable progress has been made in the technology for encoding a picture signal, in particular the technology relating to the high efficiency-encoding of a moving picture signal. With respect to the encoding technology, international standardization has been promoted and also the number of systems for encoding a moving picture signal efficiently resulting from the various utilization forms has been increased.

In one of the high efficiency-encoding systems, there is the system request for encoding and multiplexing efficiently moving picture signals corresponding to a plurality of channels to transmit or record the resultant signals, and the development thereof has been advanced.

As for the apparatuses in the progress of development, there is well known the field a pick up apparatus (hereinafter, referred to as "an FPU apparatus" for short, when applicable) of the broadcasting system. However, the FPU apparatus as an example of the prior art operates to perform processing with an analog signal to transmit a picture signal. In this connection, only the picture signal corresponding to one channel is transmitted. Therefore, that prior art FPU apparatus cannot respond to the request in which the picture signals corresponding to a plurality of channels are wanted to be transmitted simultaneously.

For the purpose of responding to that request, there has been developed an apparatus in which the high efficiency-encoding technology is applied to the FPU apparatus in order to multiplex and transmit the signals corresponding to the three channels for example. In addition, this apparatus is such that the signals of the three channels are transmitted by the high efficiency-encoding transmission with the transmission capacity of the FPU apparatus made 15 Mbps for example, and also the transmission capacity of 5 Mbps is fixedly assigned to each channel in order to multiplex and transmit the picture signals of the three channels.

However, since in this case, normally, the different picture signals are input to the respective channels, a difference in level of redundancy may necessarily occur among the picture signals of the individual channels in some cases. In such cases, the transmission capacity of 5 Mbps may be insufficient for one channel, and the transmission capacity of 5 Mbps may be sufficient for another channel. In addition, the state in which the transmission capacity of 5 Mbps may be insufficient or sufficient with respect to each channel is changed all the time, and thus it is not fixed. For example, comparing a picture signal relating to a sport having violent movement and a picture signal relating to a silent scene with each other, it is clearly shown that the picture signal relating to the silent scene has a higher level of redundancy.

The fact that although the difference occurs among the levels of redundancy, the channels have the same assigned transmission rate results in the picture quality being remarkably degraded due to the encoding with respect to the channel having the lower level of redundancy and the degradation of the picture quality being extremely reduced beyond the necessity with respect to the channel having the higher level of redundancy.

Thus, there arises the problem that if the technology of interest is not advanced beyond the prior art high efficiency-encoding technology as described above, since the transmission rates are not assigned to the channels of the FPU apparatus so as to correspond to the levels of redundancy of the picture signals of the individual channels, the method of efficiently encoding and multiplexing picture signals is not realized by which the degradation of the picture quality can be efficiently reduced in all the channels.

SUMMARY OF THE INVENTION

The present invention was made in order to solve the above-mentioned problem associated with the prior art, and it is therefore an object of the present invention to provide a method of efficiently encoding and multiplexing picture signals and an apparatus utilizing the same in which even if any kind of signal may be input to each channel, the assignment of the transmission rates corresponding to the levels of redundancy of the picture signals of the individual channels can be performed, and the degradation of the picture quality can be sufficiently reduced in all the channels.

In a picture signal encoding multiplexing method of multiplexing output encoded data, which has been supplied from a plurality of picture signal encoding processing units, in a channel multiplexing unit, according to the present invention, both encoded data and information relating to an encoded distortion due to the encoding of a picture signal are output from each of the picture signal encoding processing units to the channel multiplexing unit, and a transmission rate control signal is output from the channel multiplexing unit to each of the picture signal encoding processing units, whereby the assignment of the transmission rates corresponding to the levels of redundancy of the picture signals is performed.

In addition, each of the picture signal encoding processing units is controlled on the basis of the transmission rate Control signal supplied from the channel multiplexing unit so that the information relating to the encoded distortions supplied from the picture signal encoding processing units becomes substantially equal to one another.

In addition, in a picture signal encoding multiplexing method of multiplexing output encoded data, which has been supplied from a plurality of picture signal encoding processing units, in a channel multiplexing unit, according to the present invention, both encoded data and information relating to an encoded distortion due to the encoding of a picture signal are output from each of the picture signal encoding units to the channel multiplexing unit, and both a transmission rate control signal and an assignment code data quantity are output from the channel multiplexing unit to each of the picture signal encoding processing units, whereby the assignment of the transmission rates corresponding to the levels of redundancy of the picture signals is performed.

Further, in a picture signal encoding multiplexing method of multiplexing output encoded data, which has been supplied from a plurality of picture signal encoding processing units, which have no quantization step modifying unit and are controlled by one quantization step modifying unit, in a channel multiplexing unit, encoded data is output from each of the picture signal encoding processing units to the channel multiplexing unit, the plurality of picture signal encoding processing units are controlled by the one quantization step modifying unit and also information relating to an encoded distortion due to the encoding of a picture signal is output from the one quantization step modifying unit to the channel multiplexing unit, and a transmission rate control signal is output from the channel multiplexing unit to each of the picture signal encoding processing units, whereby the assignment of the transmission rates corresponding to the levels of redundancy of the picture signals is performed.

DESCRIPTION OF THE PREFERRED EMBODIMENTS

Figure 1:
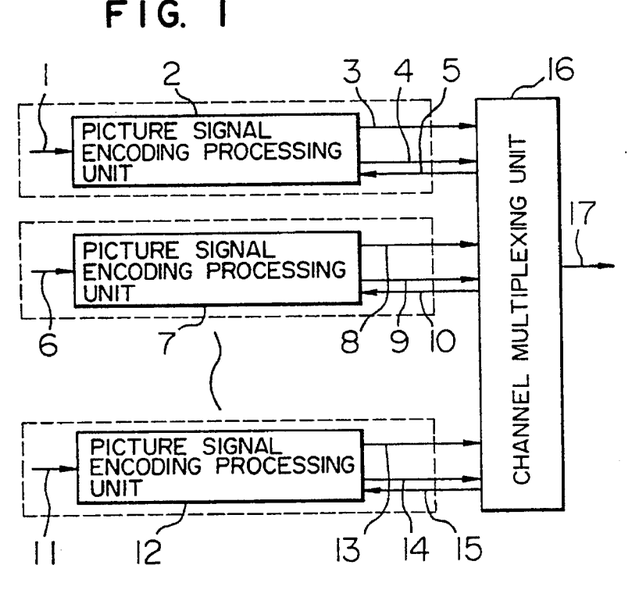
FIG. 1 is a block diagram showing the whole configuration of a picture signal encoding multiplexing apparatus according to the present invention.

FIG. 1 is a block diagram showing a whole structure of a system which carries out a picture signal encoding multiplexing method according to the present invention. By the operation of a picture signal encoding multiplexing apparatus which is shown in FIG. 1 in the form of a block diagram, the assignment of the transmission rates corresponding to the levels of redundancy of picture signals of individual channels is performed. A unit which is surrounded by a broken line corresponds to a processing unit for one channel. In this connection, the number of channels is set to an arbitrary value.

Firstly, in a first channel, a picture signal 1 is input to a picture signal encoding processing unit 2. Both information 3 (which corresponds to a quantization step signal of an embodiment described later) relating to an encoded distortion which has been generated by subjecting the picture signal 1 to the encoding processing and encoded data 4 are output from the picture signal encoding processing unit 2 to a channel multiplexing unit 16. In addition, a transmission rate control signal 5 (which corresponds to RE/OE signal of an embodiment described later) which is used to perform the assignment of the transmission rate is output from the channel multiplexing unit 16 to the picture signal encoding processing unit 2.

In a second channel, the connection between a picture signal encoding processing unit 7 and the channel multiplexing unit 16, and information 8 relating to an encoded distortion, encoded data 9 and a transmission rate control signal 10 are the same in configuration and signal element as those in the first channel. In addition, in an n-th channel (n: positive integral number), the connection between a picture signal encoding processing unit 12 and the channel multiplexing unit 16, and information 13 relating to an encoded distortion, encoded data 14 and a transmission rate control signal 15 are the same in configuration and signal element as those in the first channel. The channel multiplexing unit 16 operates to multiplex the encoded data 4, 9, . . . and 14, to which the transmission rates have been respectively assigned, to output multi-encoded data 17.

More specifically, the picture signal encoding processing units 2, 7, . . . , 12 are respectively controlled on the basis of the transmission rate control signals 5, 10, . . . , 15 in such a way that in the channel multiplexing unit 16, the input encoded distortion information 3, 8, . . . , 13 of the individual channels becomes equal to one another or close to one another.

On the basis of the above-mentioned control, the encoded data 4, 9, . . . , 14 is respectively input from the channels according to the transmission rate control signals 5, 10, . . . , 15 to the channel multiplexing unit 16 from which the multi-encoded data 17, which has been obtained by the multiplexing, is output. As a result, the transmission rates corresponding to the levels of redundancy of the picture signals of the individual channels can be automatically assigned to the respective channels.

Assigning the transmission rates corresponding to the levels of redundancy of the picture signals to the respective channels is realized by performing the control in such a way that the distortions due to the encoding of the picture signals of the individual channels become equal to one another.

Figure 2:
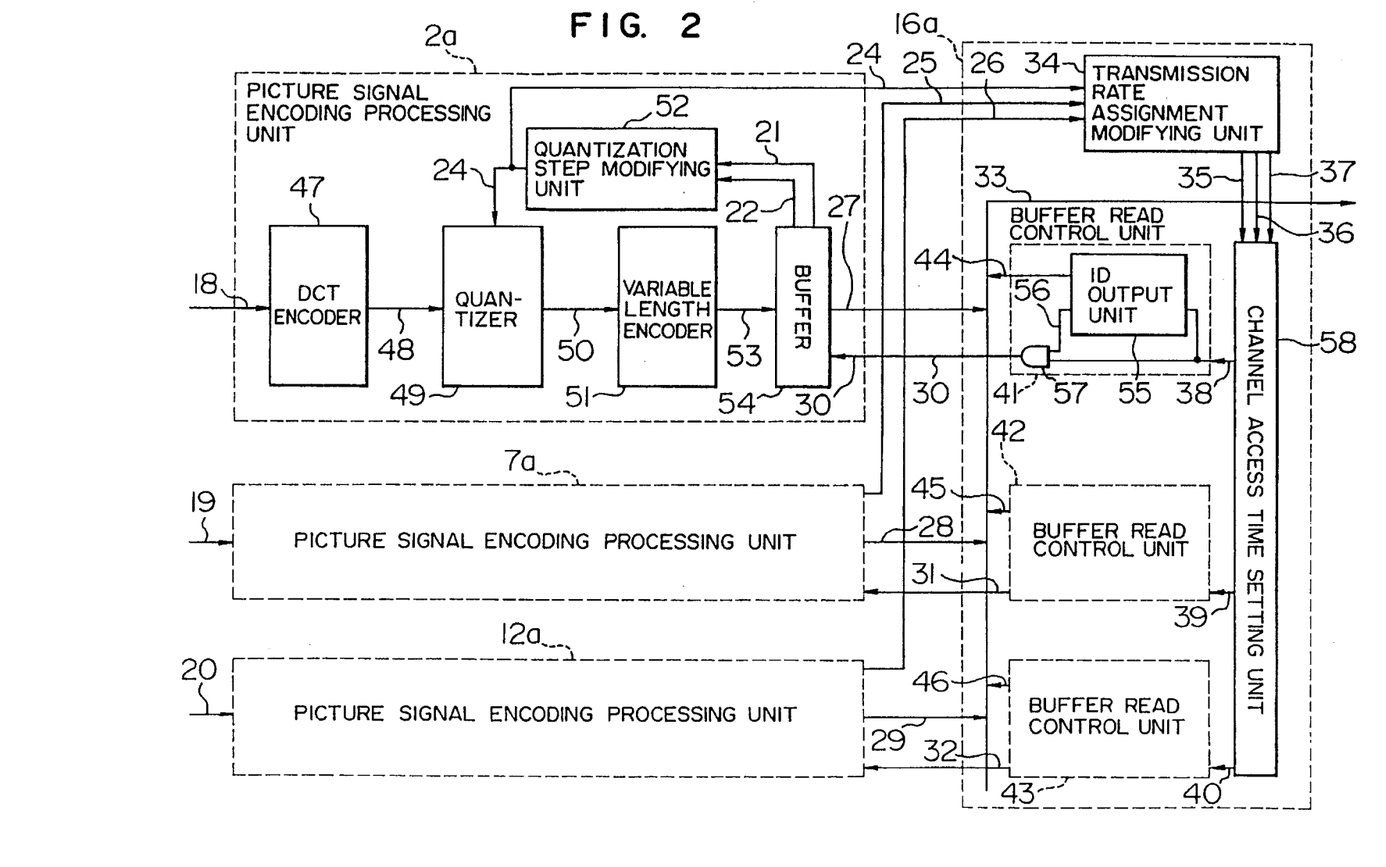
FIG. 2 is a block diagram, partly in circuit diagram, showing a configuration of one embodiment of the picture signal encoding multiplexing apparatus according to the present invention.

FIG. 2 shows a configuration of the first concrete embodiment of the present invention. In the present embodiment, basically, the information (which corresponds to the encoded distortion information 3 in FIG. 1) relating to the distortions which have been generated by the encoding of the picture signals is obtained on the basis of the step signals of quantization, and the control is performed in such a way that the quantization step signals of the individual channels become equal to one another.

The present embodiment shown in FIG. 2 shows the specific case of the three channel multiplexing. In this case, picture signals 18, 19 and 20 are respectively applied to picture signal encoding processing units 2a, 7a and 12a to be subjected to the encoding processing independently of one another.

In addition, the transmission rate control of the picture signal encoding processing units 2a, 7a and 12a shown in FIG. 2 is performed in accordance with the data storage states of buffers (although actual elements are buffer memories, hereinafter, the elements commonly called the buffers are employed therefor) which are arranged in the respective picture signal encoding processing units.

From the picture signal encoding processing units 2a, 7a and 12a, respective quantization step signals 24, 25 and 26 are output to a transmission rate assignment modifying unit 34 of a channel multiplexing unit 16a, and also respective encoded data 27, 28 and 29 is output so as to be multiplexed into the multi-encoded data 33.

On the other hand, the transmission rate assignment modifying unit 34 operates to output signals 35, 36 and 37 to a channel access time setting unit 58, and the channel access time setting unit 58 operates to output channel enable signals 38, 39 and 40 to buffer read control units 41, 42 and 43, respectively.

The buffer read control units 41, 42 and 43 operates to output RE/OE (Read Enable/Output Enable) signals 30, 31 and 32 to buffers provided in the picture signal encoding processing units of the individual channels, respectively. In addition, from ID output units, respective channel ID data 44, 45 and 46 is output so as to be multiplexed into the multi-encoded data 33.

Next, the detailed configuration of the picture signal encoding processing units 2a, 7a and 12a will hereinbelow be described. But, in this case, by taking the picture signal encoding processing unit 2a by way of example, its detailed configuration will be described here in detail.

The picture signal 18 is first applied to a discrete cosine transformation encoder (hereinafter, referred to as "a DCT encoder" for short, when applicable) 47. The DCT encoder 47 performs the motion compensation forecasting and the like and also performs the DCT transformation to output a conversion co-efficient 48 indicating of frequency components to a quantizer 49. Then, the conversion coefficient 48 is quantized in the quantizer 49 to be output as data 50 to a variable length encoder 51. The variable length encoder 51 operates to subject the data 50 to the variable length encoding processing to output encoded data 53 to a buffer 54.

Both write address data 22 and read address data 21 are output from the buffer 54 to a quantization step modifying unit 52, and also the encoded data 27 is output from the buffer 54 so as to be multiplexed into the multi-encoded data 33. At this time, the RE/OE signal 30 (which corresponds to the transmission rate control signal 5) is input from the buffer read control unit 41 to the buffer 54.

The quantization step modifying unit 52 outputs the quantization step signal 24 to both the quantizer 49 and the transmission rate assignment modifying unit 34.

Next, the detailed configuration of the buffer read control units 41, 42 and 43 will hereinbelow be described by taking the buffer read control unit 41 by way of example. The channel enable signal 38 which has been supplied from the channel access time setting unit 58 is input to both an ID output unit 55 and an AND circuit 57 which constitute the buffer read control unit 41.

From the ID output unit 55 to which the channel enable signal 38 has been input, channel ID data 44 is output so as to be multiplexed into the multi-encoded data 33 and also a signal 56 is input to the AND circuit 57. The RE/OE signal 30 is output from the AND circuit 57 to the buffer 54.

The description will hereinbelow be given with respect to the operation of the first embodiment shown in FIG. 2. First, the description will be given with respect to the operation of the picture signal encoding processing units by taking the picture signal encoding processing unit 2a by way of example.

The picture signal 18 which has been applied to the DCT encoder 47 is converted into the conversion coefficient 48 of the DCT by the DCT encoder 47 to be output to the quantizer 49. Incidentally, in the DCT encoder 47, the processings for the motion compensation forecasting and the like are also executed.

Then, the above-mentioned conversion coefficient 48 is quantized to be the data 50 by the quantizer 49 to be output to the variable length encoder 51. The processing step of quantizing the conversion coefficient 48 in the quantizer 49 is controlled by the quantization step signal 24 supplied from the quantization step modifying unit 52.

Then, the above-mentioned data 50 is encoded into the encoded data 53 by the variable length encoder 51 to be output to the buffer 54.

The buffer 54 is controlled by the RE/OE signal 30 supplied from the buffer read control unit 41 so that the encoded data 27 is output so as to be multiplexed at a set rate to be multi-encoded data 33.

More specifically, when the level of the RE/OE signal 30 goes to "1", the data stored in the memory of the buffer 54 becomes able to be read out and thus the encoded data 27 is output. On the other hand, when the level of the RE/OE signal 30 goes to "0", the read of the stored data from the buffer 54 is stopped, and thus the encoded data 27 is not output.

Now, the description will hereinbelow be given with respect to the operation for controlling the transmission rate in the picture signal encoding processing unit.

The encoded data 27 as the output of the buffer 54 is output at an objective rate, for example at 5 Mbps, which is previously determined in the system. However, for this purpose, the output rate at which the encoded data 53 as the output of the variable length encoder 51 is output to the buffer 54 needs to be made coincide with that objective rate.

With respect to this rate coincidence, the rate control of the encoded data 53 is realized in such a way that both the write address data 22 and the read address data 21 of the buffer 54 are input to the quantization step modifying unit 52, and the quantization step signal 24 as the output of the quantization step modifying unit 52 is modified in accordance with the storage state of the buffer 54, thereby controlling the quantization step of the quantizer 49.

More specifically, the control is performed in such a way that when the data value of the read address data 21 and that of the write address data 22 become close to each other (i.e., when the data stored in the buffer approaches to the empty), the rate of the encoded data 53 is increased, and on other hand, when the data value of the read address data 21 and that of the write address data 22 become apart from each other (i.e., when the data stored in the buffer approaches to the over-flow), the rate of the encoded data 53 is decreased.

Giving the description in more detail, in order to increase the rate of the encoded data 53, the quantization step of the quantizer 49 has only to be decreased. On the other hand, in order to decrease the rate of the encoded data 53, the quantization step of the quantizer 49 has only to be increased.

The quantization step modifying unit 52 outputs the quantization step signal 24 to the quantizer 49, thereby controlling the quantization step. While from the foregoing, the transmission rate control in the picture signal encoding processing unit of the channel of interest is realized, this is also applied to other picture signal encoding processing units of the remaining channels.

Next, the description will hereinbelow be given with respect to the operation for controlling the transmission rates among the channels. First, it is assumed that in the initial state, the output read is uniformly executed with respect to the picture signal encoding processing units 2a, 7a and 12a.

Then, it is further assumed that the picture signal, for example a picture signal without motion, having a higher level of redundancy is input to the picture signal encoding processing unit 2a, the picture signal, for example a picture signal with frequent motions, having a lower level of redundancy is input to the picture signal encoding processing unit 12a, and the picture signal having a middle level of redundancy is input to the picture signal encoding processing unit 7a.

Since at the time point when the picture signals which are different in level of redundancy from each other have been input, the read operation is performed at the same transmission rate in the individual channels, by the input of the picture signals having the different levels of redundancy, the difference necessarily occurs among the quantization steps of the individual channels. That is, the quantization step is the smallest in the picture signal encoding processing unit 2a to which the picture signal having the largest level of redundancy has been input, while the quantization step is the largest in the picture signal encoding processing unit 12a to which the picture signal having the smallest level of redundancy has been input.

The transmission rate assignment modifying unit 34 monitors this state all the time on the basis of the quantization step signals 24, 25 and 26 of the individual channels, and outputs the signals 35, 36 and 37 to the channel access time setting unit 58 in accordance with the state, and thus modifies the read time (quantities) of the buffers of the individual channels on the basis of the channel enable signals 38, 39 and 40. In this connection, this modification is performed in such a way that the read time interval of the buffer is made short in the channel having the smaller quantization step, while the read time interval of the buffer is made long in the channel having the larger quantization step.

Figure 3:
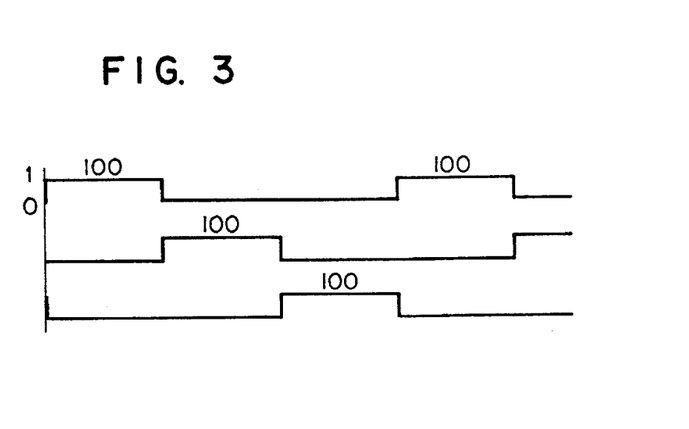
FIG. 3 is a timing chart useful in explaining the operation of the apparatus shown in FIG. 2.

The description will hereinbelow be given more concretely with respect to this operation. For example, it is assumed that the states of the channel enable signals 38, 39 and 40 before modifying the transmission rates are as shown in FIG. 3, and when the level of any one of the channel enable signals 38, 39 and 40 goes to "1", the data stored in the buffer of the corresponding channel becomes able to be read out.

Therefore, in the state before modifying the transmission rates, all the read time intervals are 100 in length, i.e., are equal in length to one another. Then, the transmission rate assignment modifying unit 34 detects the difference in the quantization step on the basis of the quantization step signals 24, 25 and 26.

For example, it is assumed that the quantization step Q1 of the picture signal encoding processing unit 2a is 20, the quantization step Q2 of the picture signal encoding processing unit 7a is 50, and the quantization step Q3 of the picture signal encoding processing unit 12a is 80.

Then, the transmission rate assignment modifying unit 34 obtains the modification quantities D1, D2 and D3 of the channel enable signals 38, 39 and 40 on the basis of the following expressions, and outputs the resultant information in the form of the signals 35, 36 and 37 to the channel access time setting unit 58.

$Qave=(Q1+Q2+Q3)/3=50$ $D1=K (Q1-Qave)=-30$ (in the case of K=1)

$D2=K (Q2-Qave)=0$ (in the case of K=1)

$D3=K (Q3-Qave)=30$ (in the case of K=1)

where Qave represents the uniform quantization step.

Figure 4:
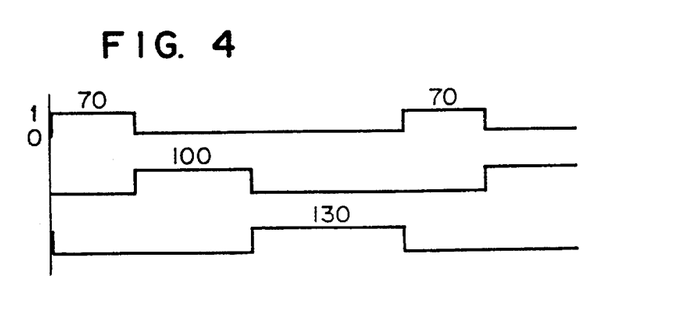
FIG. 4 is a timing chart useful in explaining the operation of the apparatus shown in FIG. 2.

While the value of the variable K can be arbitrarily set depending on the system, in this case, for the sake of convenience, the relationship of K=1 is established. As a result, the channel enable signals 38, 39 and 40 show the respective states as shown in FIG. 4.

After the completion of this processing, in the channel in which the level of redundancy was larger, the transmission rate becomes smaller, and in the channel in which the level of redundancy was smaller, the transmission rate becomes larger all the more. Therefore, as a result of the above-mentioned rate control operation in the picture signal encoding processing units, the relationships of Q1>20, Q2=50 and Q3<80 are obtained, and then, the respective quantization steps become close to one another. In addition, if the same operation is executed with respect to the changed quantization steps Q1, Q2 and Q3, the relationship of $Q1 \approx Q2 \approx Q3 \approx$ Qave is established.

Incidentally, the modification quantities D1, D2 and D3 may not necessarily depend on the above expressions. In the simplest case, it is judged whether the quantization step (Q1, Q2 or Q3) of the channel of interest is larger or smaller than Qave. Then, if it is judged that the quantization step of the channel of interest is larger than Qave, a predetermined certain positive quantity is employed as the modification quantity. On the other hand, if it is judged that the quantization step of the channel of interest is smaller than Qave, a predetermined certain negative quantity is employed as the modification quantity. This method may also be available. While this predetermined quantity is a fixed value. The executing this operation again and relationship of $Q1 \approx Q2 \approx Q3$ can be established by again.

In addition, it is to be understood that until the relationship of Q1=Q2=Q3 is perfectly established, any modification quantity does not need to be given. If the relationship of Q1=Q2=Q3 is intended to be perfectly established, there is the possibility that the oscillation occurs in the vicinity thereof. Therefore, in the case where if the relationship of Q1=Q2=Q3 is approximately established, the modification quantity is made zero, it is possible to obtain the more stable picture quality.

Making the quantization steps identical to one another means that the distortions in the individual channels are made substantially the same and also the assignment of the transmission rates corresponding to the levels of redundancy can be performed since in the encoding with the DCT as the base, the most important cause of the distortion due to the encoding is directly related to the quantization step.

Incidentally, to the multi-encoded data 33, the data is inserted on the basis of which the channel of interest can be recognized in the break of the encoded data of the individual channels. The reason that such a procedure is adopted is that since the multiplexing rate of the encoded data of the channels is dynamically changed as described above, the channel of interest needs to be recognized on the decoding side.

For this purpose, before the encoded data 27, 28 and 29 of the individual channels is multiplexed into the multi-encoded data 33 to be output, the channel ID data 44, 45 and 46 for the channel identification is inserted. This processing is realized by the buffer read control units 41, 42 and 43.

For example, in the buffer read control unit 41, when the level of the channel enable signal 38 goes to "1", at the same time, the necessary channel ID data 44 is output from the ID output unit 55 before output of the encoded data 27 to be contained in the multi-encoded data 33. Then, since the gate of the AND circuit is disabled on the basis of the the signal 56 supplied from the ID output unit 55 in such a way that for this period of time, the storage data is not read out from the buffer 54 in the picture signal encoding processing unit 2a, the level of the RE/OE signal does not go to "1". After the completion of the output of the signal of the ID data 44, the gate of the AND circuit 57 is enabled so that the storage data is started to be read out from the buffer 54.

Now, the description will hereinafter be given with respect to the second concrete embodiment of the picture signal encoding multiplexing method according to the present invention. While in the second embodiment shown in FIG. 2, the transmission rate control in each of the picture signal encoding processing units was described on the basis of the technology for controlling the buffer, it is to be understood that even in the case where the buffer is not controlled, the present invention can be applied thereto.

Figure 5:
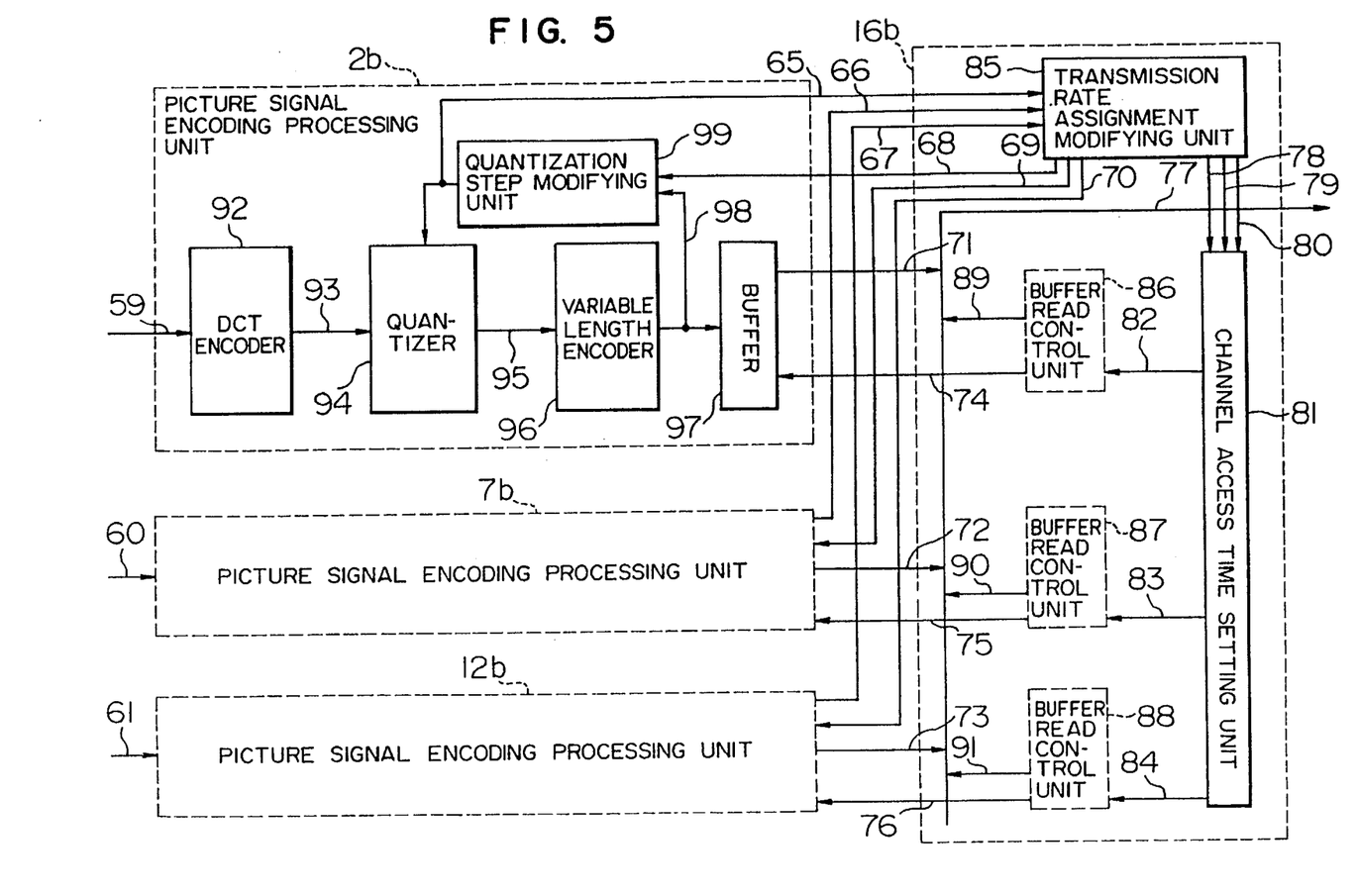
FIG. 5 is a block diagram showing a configuration of another embodiment of the picture signal encoding multiplexing apparatus according to the present invention.

As one example, there is a method wherein the difference between the target code data quantity and the actual occurrence code data quantity is detected, and the quantization step is successively modified so as for the actual occurrence code data quantity to approaches to the target code data quantity. An embodiment in this case is shown in FIG. 5. In the present embodiment, the quantization step modifying unit in each of the picture signal encoding processing units 2b, 7b and 12b and the transmission rate assignment modifying unit 85 are different in configuration from those in the above-mentioned embodiment of FIG. 2. Now, in also FIG. 5, the quantization step signal and the RE/OE signal correspond to the coding distortion information and the transmission rate control signal, respectively.

The operation of the apparatus shown in FIG. 5 will hereinbelow be described mainly with respect to a point of difference of the present embodiment from the above-mentioned embodiment of FIG. 2. The description will hereinbelow be given with respect to the operation of quantization step modifying units in the picture signal encoding processing units 2b, 7b and 12b by taking a quantization step modifying unit 99 by way of example.

In order to realize the transmission rate control, the quantization step modifying unit 99 operates to detect the occurrence code data quantity (e.g., one frame unit) on the basis of encoded data 98 as the output of a variable length encoder 96 as one of the two input signals, compare the occurrence code data quantity thus detected with the target code data quantity (e.g., the code data quantity for one frame) which is calculated on the basis of an assignment code data quantity 68 (e.g., the code data quantity for a plurality of continuous image frames) as the output of a transmission rate assignment modifying unit 85 as the other input signal, and modify successively a quantization step signal 65 as the output of the quantization step modifying unit 99 so as for the two data quantities to be equal to each other.

Now, in order to prevent the overflow or empty from occurring in the buffer 97, encoded data 71 has only to be read out from a buffer 97 at a transmission rate corresponding to the assignment code data quantity 68.

In the case where each channel is constituted by such a picture signal encoding processing unit, the transmission rate control among the channels can be realized by modifying, in addition to the RE/OE signals 74, 75 and 76 input to the respective buffers, the assignment code data quantities 68, 69 and 70. The operation for modifying the RE/OE signals 74, 75 and 76 is the same as that described with reference to FIG. 2, and thus the assignment code data quantities 68, 69 and 70 may be modified in accordance therewith.

Incidentally, in the embodiments shown in FIGS. 2 and 5, the quantization step which is obtained from the quantization step signals 24, 25 and 26 or 65, 66 and 67 may be either a mean value or a central value of the quantization steps of the conversion coefficients.

In addition, the effects of the present invention can be obtained in the case where one picture signal is divided to be assigned to a plurality of channels to be encoded through the parallel processing as well as in the case where the independent picture signals of a plurality of systems are managed.

More specifically, in the case where the signal of the high definition image such as the HDTV image is input, the pixel rate thereof reaches 74 MHz, and thus, in terms of the present hardware capability, the parallel processing is required. Then, it is sufficiently considered that even when from such necessity, the signal of one image is divided, if the divided data is compared with one another, the difference occurs among the levels of redundancy. That is, certain divided data may correspond to the simple image portion such as the sky, while other divided data may correspond to the complicated image portion such as a pattern of the clothes.

Figure 6:
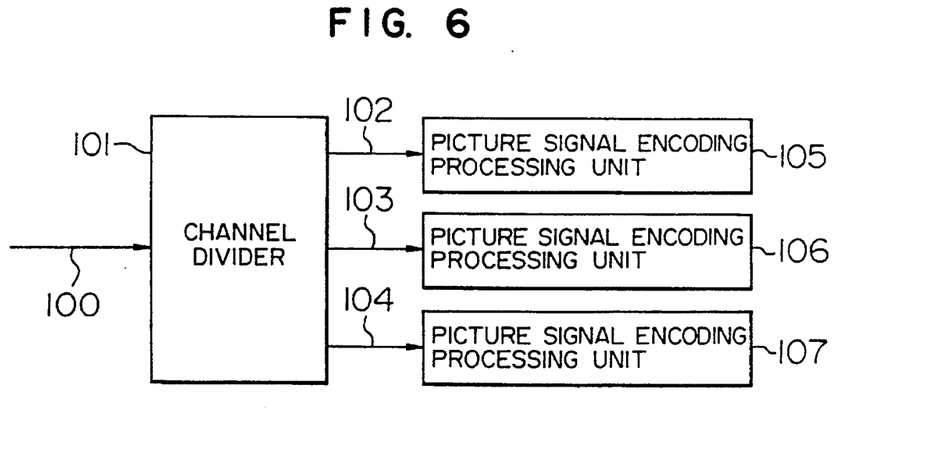
FIG. 6 is a block diagram showing a configuration in the case where one input picture signal is divided to process the resultant signals in the picture signal encoding multiplexing apparatus according to the present invention.

FIG. 6 shows an example of a configuration in which a single picture signal is divided into a plurality of data and the plurality of divided data is encoded in a plurality of picture signal encoding processing units. One input picture signal 100 is divided into data 102, 103 and 104 by a channel divider 101 and then the resultant data 102, 103 and 104 is respectively input to picture signal encoding processing units 105, 106 and 107 corresponding to respective channels to be subjected to the encoding processing. As a result, the difference occurs among the levels of redundancy of the data 102, 103 and 104 which was given as described above. Then, if the data 102, 103 and 104 is simply encoded at the same transmission rate, there will arise the same disadvantage as that in the prior art. Therefore, even in such a case as well, that disadvantage can be readily solved by the present invention. Incidentally, as for the dividing processing executed by the channel divider 101, in addition to the division performed every area, there is considered the case where the input picture signal 100 is divided into the luminance signal and the color-difference signal.

Figure 7:
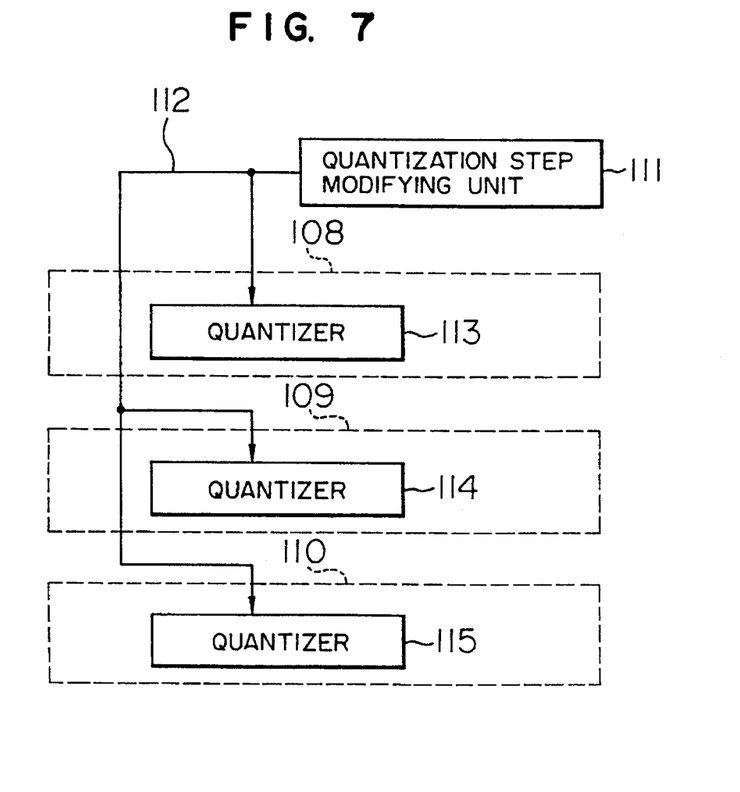
FIG. 7 is a block diagram showing a configuration in the case where one quantization step modifying unit is employed in the picture signal encoding multiplexing apparatus according to the present invention.

In addition, in the embodiments of the present invention shown in FIGS. 2 and 5, the quantization step modifying unit is provided in each of the picture signal encoding processing units. However, the configuration may also be available such that as shown in FIG. 7, the centralized control is carried out on the basis of only a quantization step signal 112 supplied from one quantization step modifying unit 111. As a result, the control can be carried out in such a way that the quantization steps in quantizers 113, 114 and 115, which are respectively provided in picture signal encoding processing units 108, 109 and 110, are equal to one another, and thus, the same effects can be obtained.

Figure 8:
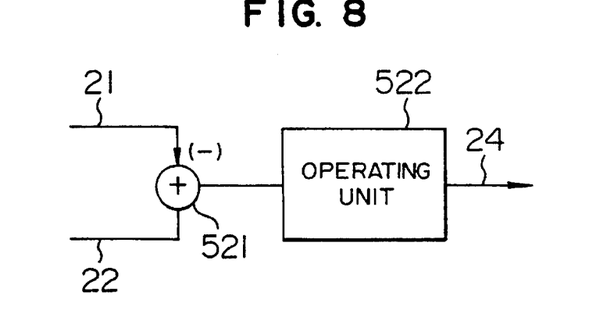
FIG. 8 shows one example of the concrete circuit structure of the quantization step modifying unit 52 of FIG. 2.

FIG. 8 shows one example of the concrete circuit structure of the quantization step modifying unit 52 of FIG. 2. The adder 521 products the sum of the read address data 21 in negative polarity and the write address data 22. The output of the adder 521 corresponds to the buffer-fullness. The operating unit 522 calculates the quantization step signal corresponding to the step size with the equation "step size =2+ buffer-fullness (kbit)/2". The adder 521 determines the accumulate amount of the buffer.

Figure 9:
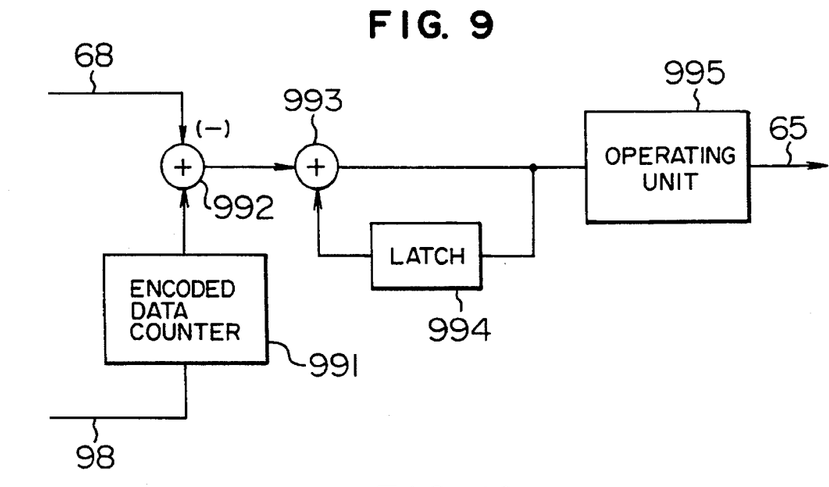
FIG. 9 shows an example of the concrete circuit structure of the quantization step modifying unit 99 of FIG. 5.

FIG. 9 shows an example of the concrete circuit structure of the quantization step modifying unit 99 of FIG. 5. The encoded data counter 991 counts the data number of the encoded data 98. The counted number represents amount of produced codes. The difference between the counted number and the assignment code data quantity 68 is produced by the adder (subtracter) 992, and then is added with the past accumulated quantity so as to produce the present accumulated quantity. The present accumulated quantity is latched with the latch 994. The operating unit 995 calculates the quantization step signal corresponding to the step size with the same equation as the operation unit 522.

Some examples of the quantization step modifying unit are shown in "Image Communication System", Technical Reports of The Institute of Television Engineers of Japan, Vol. 16, No. 61, October 1992, pp. 45–47.

Figure 10:
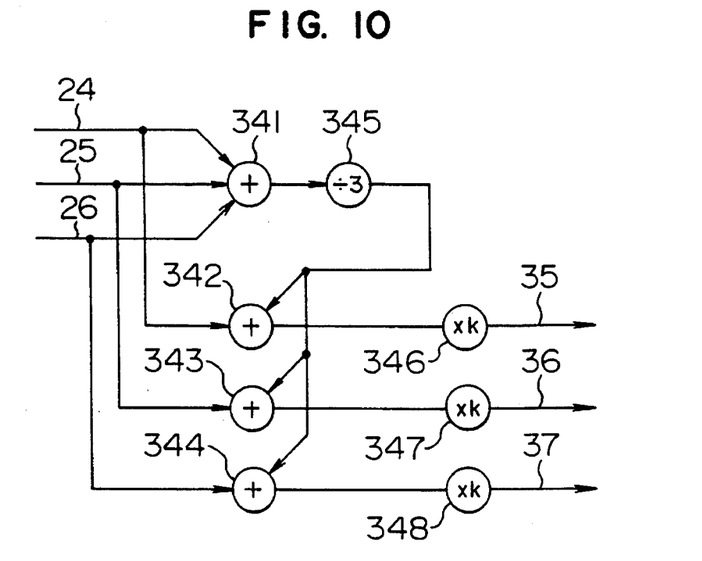
FIG. 10 shows an example of the circuit structure of the transmission rate assignment modifying unit 34 shown in FIG. 2.

FIG. 10 shows an example of the circuit structure of the transmission rate assignment modifying unit 34 shown in FIG. 2. The blocks indicates by the reference numbers 341, 342, 343 and 344 are adders (subtractors). The reference number 345 indicates a divider which divides the input by 3. The blocks indicated by the reference numbers 346, 347 and 348 are multipliers each of which multiplies the input by k (k is a predetermined number).

Figure 11:
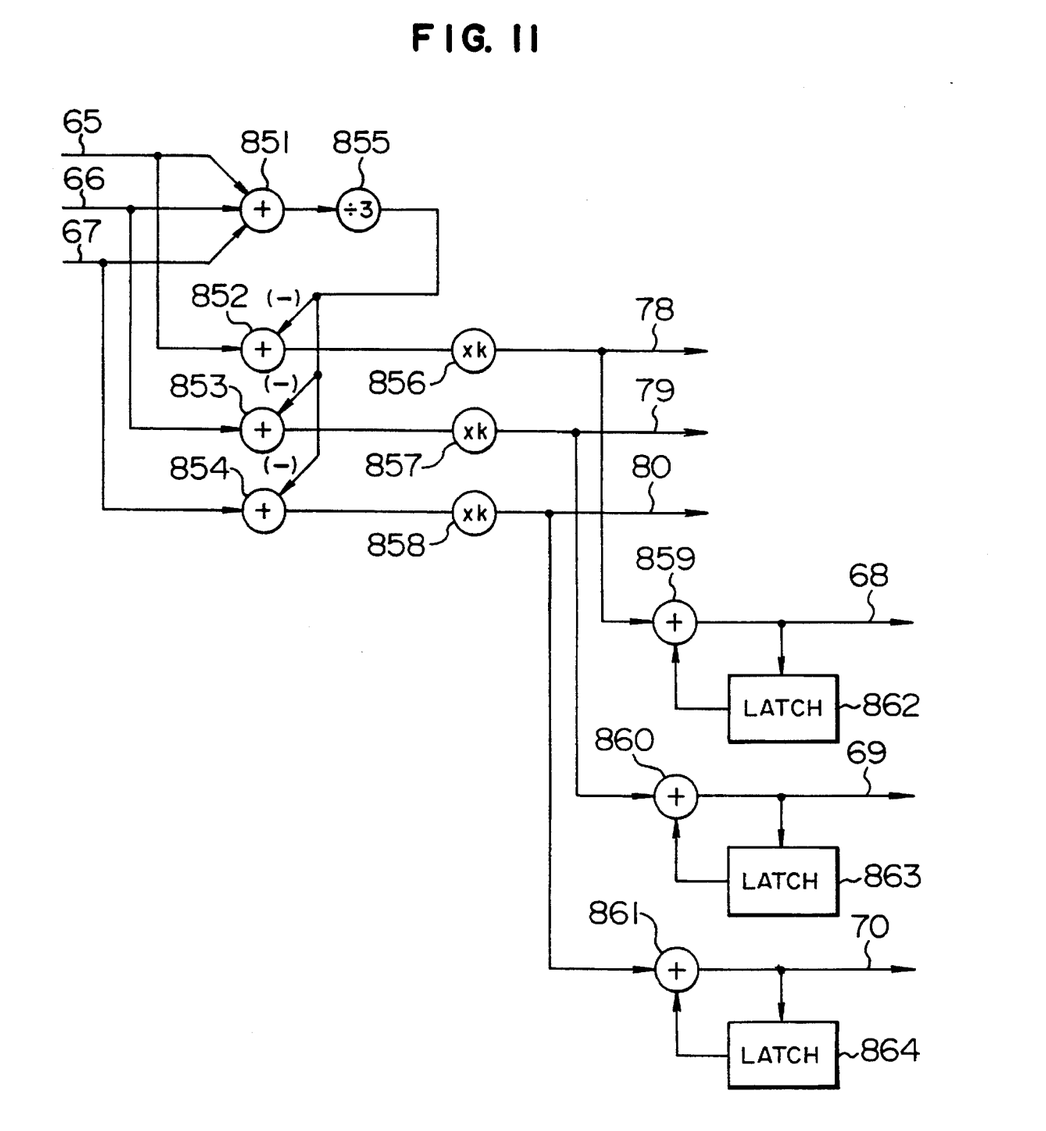
FIG. 11 shows an example of the circuit structure of the transmission rate assignment modifying unit 85 shown in FIG. 5.

FIG. 11 shows an example of the circuit structure of the transmission rate assignment modifying unit 85 shown in FIG. 5. The blocks indicated by the reference numbers 851, 852, 853, 854, 859, 860 and 861 are adders (subtractors). The reference number 855 indicates a divider which divides the input by 3. The blocks indicated by the reference numbers 856, 857 and 858 are multipliers each of which multiplies the input by k (k is a predetermined number). The blocks indicated by the reference numbers 862, 863 and 864 are latch circuits.

As set forth hereinabove, according to the present invention, even if any kind of picture signal is applied to each channel, the assignment of the transmission rates corresponding to the levels of redundancy of the picture signals of the individual channels can be performed. Thus, it is possible to realize the method of encoding and multiplexing picture signals more efficiently by which the degradation of the picture quality can be sufficiently reduced.

What is claimed is:

1. A picture signal encoding multiplexing method in which a plurality of picture signals are supplied to a plurality of picture signal encoding processing units, respectively, each of which has a quantization step modifying unit and a quantizing unit controlled by the output of said quantization step modifying unit, and the encoded data from said picture signal encoding processing units is multiplexed in a channel multiplexing unit having a transmission rate assignment modifying unit for controlling the respective output of said picture signal encoding processing units, said method comprising the steps of:

detecting a quantization step signal of each of said quantizing units in each of said quantization step modifying units;

generating transmission rate control signals corresponding to said quantization step signals in said transmission rate assignment modifying unit, said transmission rate control signals being so controlled that said respective quantization step signals from said quantization step modifying unit become substantially equal to one another; and controlling said encoded data transmitted from said picture signal encoding processing units to said channel multiplexing unit in accordance with said transmission rate control signals.

2. A picture signal encoding multiplexing method according to claim 1, wherein in each of said picture signal encoding processing units, the picture signal is quantized on the basis of a quantization step signal, the quantized data is encoded, and the encoded data is stored in buffer means, and the quantization step signal is controlled in accordance with the storage quantity of encoded signal in said buffer means.

3. A picture signal encoding multiplexing method according to claim 2, wherein in said channel multiplexing unit, and the time when reading out the encoded data from said buffer means in each of said picture signal encoding processing units is adjusted in accordance with said transmission rate control signal.

4. A picture signal encoding multiplexing method according to claim 3, Wherein the reading time of said buffer means is adjusted in accordance with said transmission rate control signal.

5. A picture signal encoding multiplexing apparatus for receiving a plurality of picture signals, encoding a plurality of said picture signals in a plurality of picture signal encoding processing units and multiplexing the encoded data in a channel multiplexing unit, said apparatus comprising:

means for supplying said picture signals to said picture signal encoding processing units, respectively;

means for encoding said picture signals and supplying the encoded data to said channel multiplexing unit;

means for respectively detecting quantization step signals $Q_1, Q_2 \ldots Q_n$, where $1, 2 \ldots$ and n are number of picture signals, from said encoding means in said respective picture signal encoding processing units;

means for generating transmission rate control signals corresponding to said quantization step signals in said respective picture encoding processing units, said generating means being so controlled that the relationship of said quantization step signals is $Q_1 \approx Q_2 Z \ldots \approx Q_n$; and means for controlling said encoded data from said picture signal encoding processing units to said channel multiplexing unit in accordance with said transmission rate control signals.

* * * * *

UNITED STATES PATENT AND TRADEMARK OFFICE
CERTIFICATE OF CORRECTION

PATENT NO. : 5,500,676
DATED : March 19, 1996
INVENTOR(S) : TANAKA et al.

It is certified that error appears in the above-indentified patent and that said Letters Patent is hereby corrected as shown below:

Claim 6, col. 12, should read as follows:

A picture signal encoding multiplexing method according to Claim 2, wherein the quantization step signal is output from one quantization step modifying unit which is common to said plurality of picture signal encoding processing units.

Signed and Sealed this

Twenty-seventh Day of August, 1996

Attest:

BRUCE LEHMAN

*Attesting Officer*  *Commissioner of Patents and Trademarks*